[19] United States Patent
Acampora et al.

[11] 4,178,550
[45] Dec. 11, 1979

[54] METHOD AND APPARATUS TO PERMIT SUBSTANTIAL CANCELLATION OF INTERFERENCE BETWEEN A RECEIVED FIRST AND SECOND SIGNAL

[75] Inventors: Anthony Acampora, Freehold; Douglas O. J. Reudink, Sea Grit; Yu S. Yeh, Freehold Township, Monmouth County, all of N.J.

[73] Assignee: Bell Telephone Laboratories, Incorporated, Murray Hill, N.J.

[21] Appl. No.: 803,152

[22] Filed: Jun. 3, 1977

[51] Int. Cl.² .................... H04J 13/00; H04B 3/60; H04B 15/00
[52] U.S. Cl. ................... 325/41; 179/15 AE; 325/4; 340/146.1 BE; 343/100 CS; 343/100 ST; 343/201; 343/207
[58] Field of Search ................. 325/4, 41, 42, 43, 65, 325/115, 139, 158, 156, 157; 343/100 CS, 100 ST, 201, 203, 205-208; 340/146.1 BE, 146.1 AQ; 179/15 R, 15 AE

[56] References Cited

U.S. PATENT DOCUMENTS

| Re. 27,478 | 9/1972 | Battail et al. ........................ 325/304 |
| 2,520,184 | 8/1950 | Ullrich ............................. 343/100 R |
| 3,094,695 | 6/1963 | Jahn ..................................... 343/100 |
| 3,369,235 | 2/1968 | Odams et al. ........................ 343/100 |
| 3,710,255 | 1/1973 | Gicca ..................................... 325/4 |
| 3,789,360 | 1/1974 | Clark, Jr. et al. ......... 340/146.1 AQ |
| 3,815,028 | 6/1974 | Rabow ................................. 325/304 |
| 3,987,444 | 10/1976 | Masak et al. .................. 343/100 LE |
| 4,063,038 | 12/1977 | Kaul et al. ....................... 179/15 AE |

Primary Examiner—Robert L. Griffin
Assistant Examiner—Marc E. Bookbinder
Attorney, Agent, or Firm—Erwin W. Pfeifle

[57] ABSTRACT

The present invention relates to method and apparatus for substantially reducing the effects of interference at a receiver between concurrently received first and second digital signals which use the same frequency spectrum. Interference between signals is effectively reduced by transmitting the first digital signal in an uncoded form while concurrently transmitting the second digital signal with both reduced capacity when compared with the first signal and in coded form using a forward error correcting code such as, for example, a block or convolutional code. At the receiver intercepting both digital signals, a suitable detection process is performed to decode the second signal and separate both signals. The present invention is applicable to the simultaneous satellite transmission of an area coverage beam and a plurality of spot coverage beams or to increase capacity on a radio channel.

13 Claims, 5 Drawing Figures

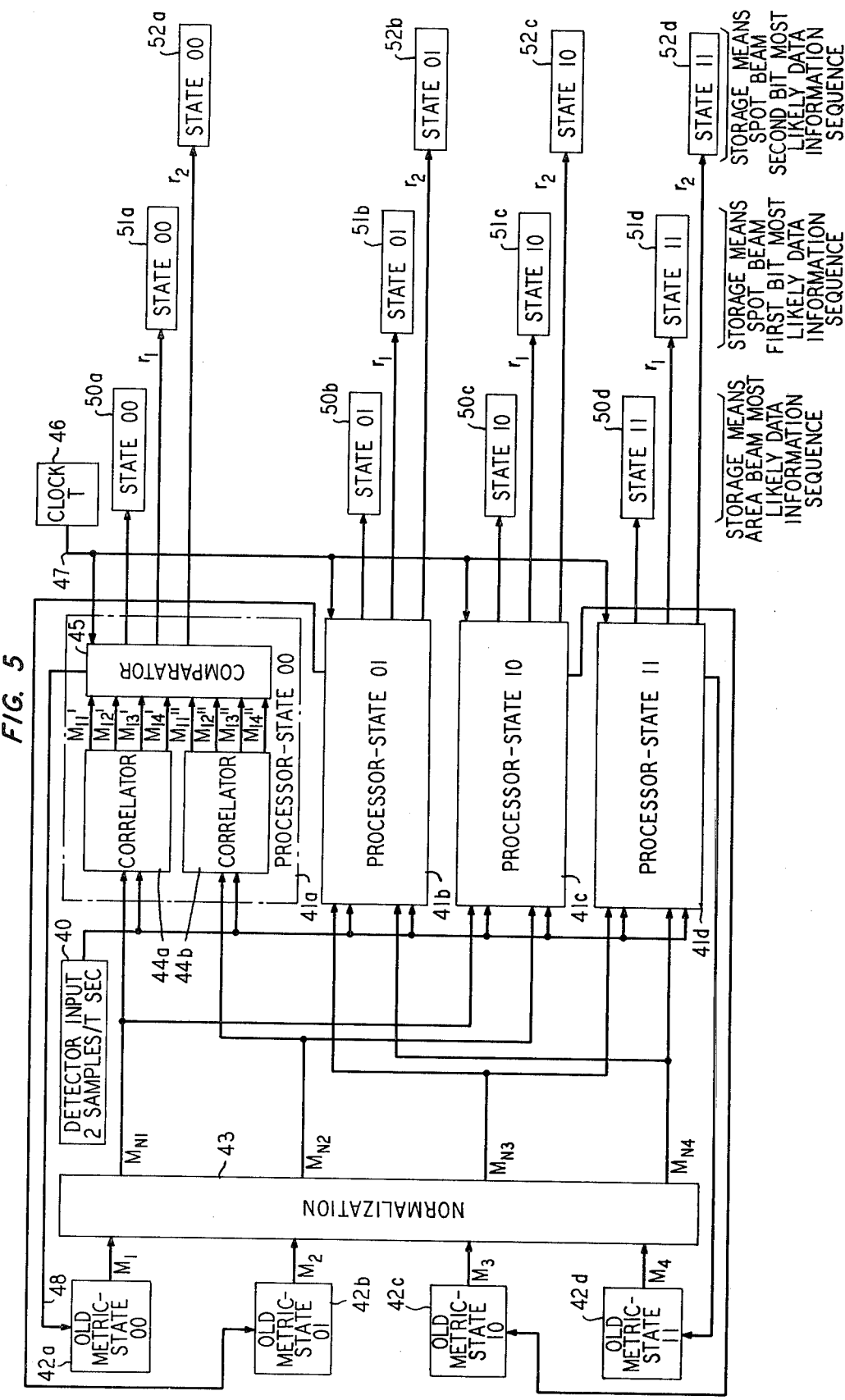

METHOD AND APPARATUS TO PERMIT SUBSTANTIAL CANCELLATION OF INTERFERENCE BETWEEN A RECEIVED FIRST AND SECOND SIGNAL

BACKGROUND OF THE INVENTION

1. Field of the Invention

The present invention relates to method and apparatus for effecting separation and substantial cancellation of interference at a receiver between a first and a second received digital signal which use the same frequency spectrum and are received from the same general direction and, more particularly, to method and apparatus for effecting separation and substantial cancellation of interference at a receiver between a first and a second digital signal which use the same frequency spectrum and are received from the same general direction in, for example, either overlapping area coverage and spot coverage satellite radiated beams, respectively, or in the same radio beam to achieve increased capacity or service.

2. Description of the Prior Art

In a domestic satellite communication system the coexistence of spot and area coverage beams can be desirable. For example, a separate spot coverage beam can be used for communication between the satellite and each high traffic ground station while an area coverage beam can be used for communication between the satellite and a plurality of low traffic ground stations under conditions where it might not be desirable to interconnect the individual low traffic ground stations to a nearest high traffic ground station for access to the satellite system. To avoid signal degradation and permit separation of the overlapping spot coverage and area coverage beams especially at each spot coverage receiving station, a typical prior art technique would be to use separate bandwidths or polarizations, if possible, for the spot coverage beams and the area coverage beam. Using separate bandwidths, however, results in inefficient use of the frequency spectrum and different polarizations may not be available where dual polarization beams are already used.

Various techniques have been devised to suppress interference between two beams arriving at a receiver from separate directions. In this regard see, for instance, U.S. Pat. Nos. 2,520,184 issued to E. H. Ullrich on Aug. 29, 1950; 3,094,695 issued to D. M. Jahn on June 18, 1963; 3,369,235 issued to C. E. Odams et al on Feb. 13, 1968 and 3,987,444 issued to R. J. Masak et al Oct. 19, 1976. Since the area and spot coverage beams transmitted from a satellite arrive at each spot beam ground station from the same direction, techniques for separating signals from different directions are not usable.

An alternative technique to enable reception of two or more signals at an FM receiver would be to modulate the carrier of each transmitter with a separate address frequency that is assigned to an associated receiver as disclosed, for example, in U.S. Pat. No. Re. 27,478 issued to G. P. Battail et al on Sept. 19, 1972. Such arrangement may be applicable to FM communication systems but does not appear applicable to a digital communication system.

The problem remaining in the prior art is to provide a technique which permits two digital signals using the same frequency spectrum and general transmission direction to be simultaneously transmitted on one radio channel or overlapping spot and area coverage beams with the ability for the signals to be separated at a receiving station intercepting both signals.

SUMMARY OF THE INVENTION

The present invention relates to method and apparatus for effecting separation and substantial cancellation of interference at a receiver between a first and a second received digital signal which use the same frequency spectrum and are received from the same general direction and, more particularly, to method and apparatus for effecting separation and substantial cancellation of interference at a receiver between a first and a second digital signal which use the same frequency spectrum and are received from the same general direction in, for example, either overlapping area coverage and spot coverage satellite radiated beams, respectively, or in the same radio channel to achieve increased capacity or service.

It is an aspect of the present invention to effect separation and substantial cancellation of interference at a receiver between a first and a second received digital signal which use the same frequency spectrum and are received from the same direction by transmitting the first digital signal in an uncoded form while concurrently transmitting the second digital signal with lower capacity and in a coded form using a forward error correcting code such as, for example, a block or convolutional code. At the receiver intercepting both digital signals, a suitable detection process is performed to separate the two signals and decode the second signal. The preferred detection process is shown to be a joint maximum-likelihood detection process. Where only one of the two signals is destined for the intercepting receiver, that signal is retained for subsequent use and the other signal is discarded.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 5 is a block diagram of an arrangement for implementing the joint maximum-likelihood detector at a receiving station in accordance with the present invention.

DETAILED DESCRIPTION

The present invention has been described primarily in relationship to a satellite communication system to enable the concurrent use of an area coverage satellite radiated beam and a plurality of spot coverage satellite radiated beams where all of the beams use the same frequency spectrum and the spot coverage beams are received within the area encompassed by the area coverage beam. However, it will be understood that such description is exemplary only and is for the purpose of exposition and not for purposes of limitation. It will be readily appreciated that the inventive concept described can be equally applicable to other radiated wave transmission systems which comprise two or more beams which have different destinations but interfere with each other at one or more of the destinations. Alternatively, the present invention can be used to increase the capacity of a radio channel by 50 percent by simultaneously transmitting an uncoded first digital signal and a coded second digital signal with reduced capacity on each radio channel according to the concept to be described hereinafter for the individual area and spot coverage beams.

Figure 1:
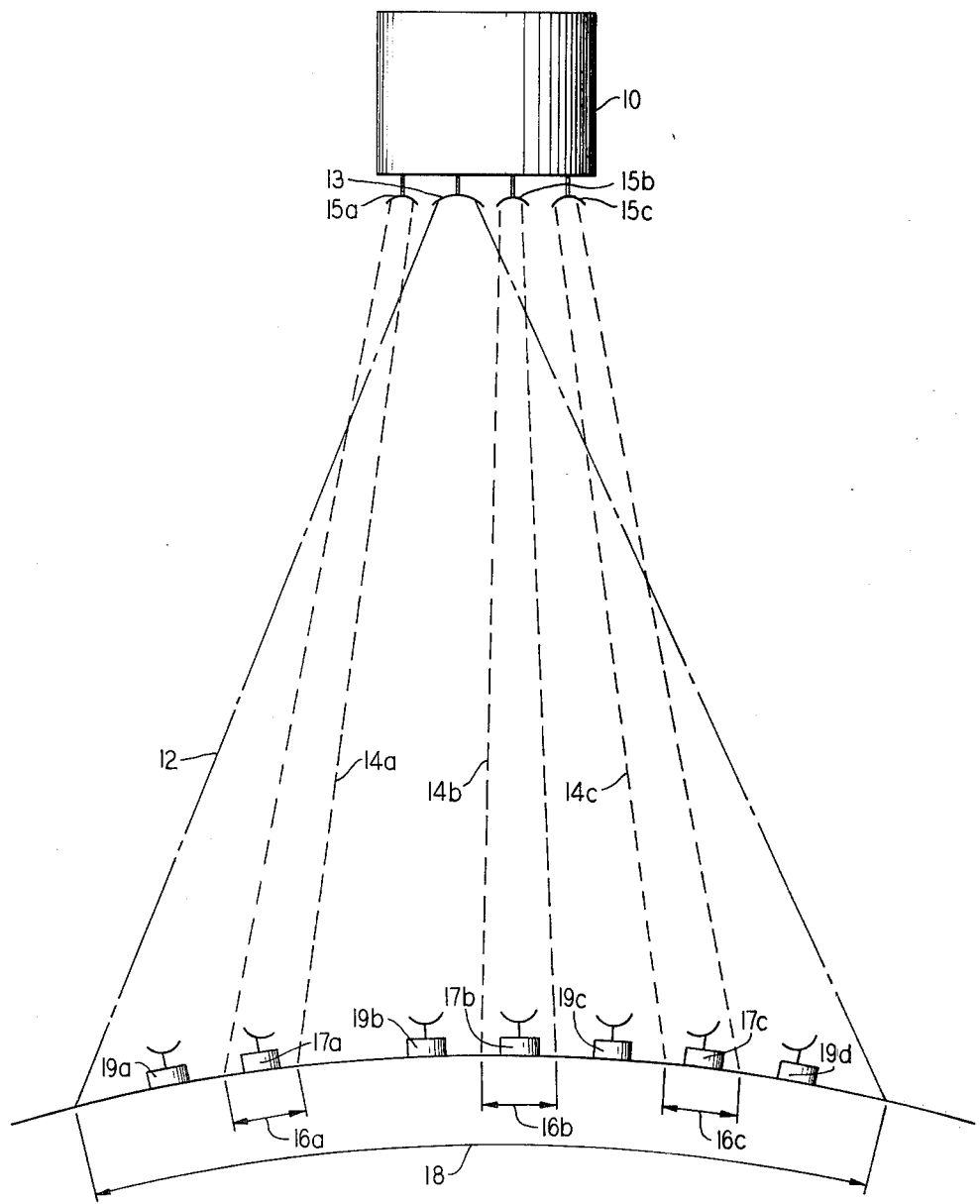
FIG. 1 diagrammatically illustrates a satellite communication system for providing both an area coverage beam and a plurality of spot coverage beams between the satellite and associated ground receiver stations.

In FIG. 1, a satellite communication system is illustrated wherein the present invention is especially useful to permit the concurrent transmission from a satellite 10 of both an area coverage beam 12 and a plurality of spot coverage beams of which, for example, three beams 14a, 14b and 14c are shown with all beams being able to use the same frequency spectrum. Spot coverage beams 14a, 14b and 14c are shown radiating from antennae 15a, 15b, and 15c, respectively, and directed at respective ground areas 16a, 16b and 16c which include, for example, high traffic ground stations 17a, 17b and 17c, respectively. Area coverage beam 12 is shown radiating from an antenna 13 and directed at a ground area 18 which includes both the ground areas 16a, 16b and 16c and a plurality of low traffic ground stations of which, for example, four stations 19a–19d are shown. In the satellite communication system of FIG. 1, each of the high traffic ground stations 17a–17c communicates with satellite 10 via a separate spot beam 14a–14c, respectively, while the low traffic ground stations 19a–19d communicate with satellite 10 via area coverage beam 12 using any suitable technique to assure that a particular message will be processed by only the appropriate one of stations 19a–19d. Such arrangement permits low traffic ground stations 19a–19d to communicate with satellite 10 under conditions where it is not advantageous to connect a low traffic ground station 19 to a nearby one of high traffic ground stations 17a–17c.

It can be seen from FIG. 1 that when area coverage beam 12 and spot coverage beams 14a–14c are transmitted concurrently and use the same frequency spectrum, each of ground stations 17a–17c will receive both the associated one of spot coverage beams 14a–14c and area coverage beam 12 since these beams emmanate from approximately the same point. Under such conditions the use of prior art arrangements such as, for example, side lobe suppression arrangements to select a wave received from a particular direction over waves received from other directions is not feasible.

Figure 2:
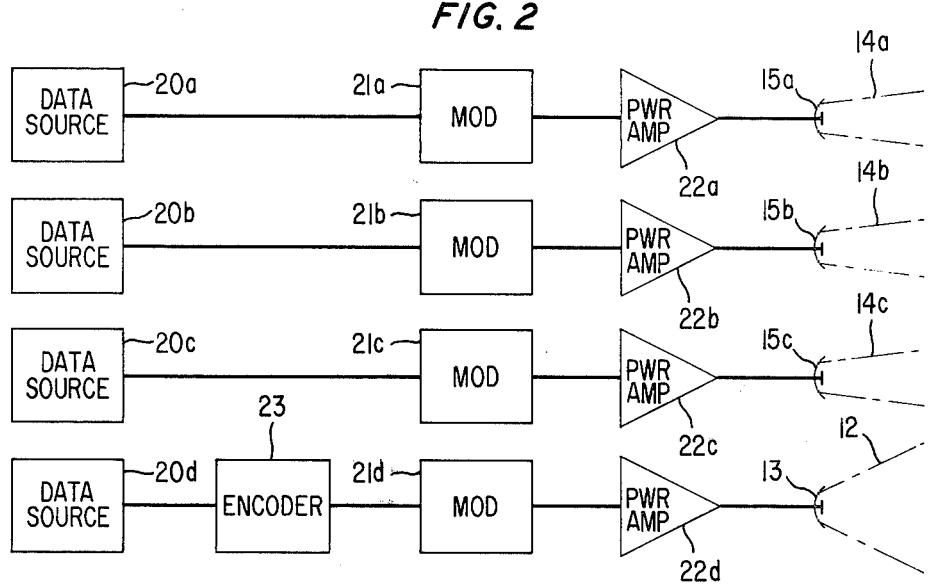
FIG. 2 illustrates an arrangement according to the present invention to effect interference cancellation between the area coverage beam and each of the spot coverage beams at each of the receiver stations.

The concurrent transmission of area coverage beam 12 and a plurality of spot coverage beams 14a–14c which use the same frequency spectrum without interference can be effected in accordance with the present invention by the typical arrangement shown in FIG. 2. There, a separate source of data 20a–20c generates the digital signals destined to be transmitted via spot coverage beams 14a–14c, respectively. The digital data signals generated by each of data sources 20a–20c are modulated to the desired frequency spectrum for transmission in separate modulators 21a–21c, respectively. The outputs from modulators 21a–21c are amplified in power amplifiers 22a–22c, respectively, prior to being applied to the respective antennae 15a–15c for transmission via spot coverage beams 14a–14c, respectively. The digital signals to be transmitted via area coverage beam 12 are similarly generated by a data source 20d but at a reduced data rate which is, for example, approximately one-half the rate of sources 20a–20c. These latter signals are, however, first encoded in channel encoder 23 using a forward error correcting code such as, for example, a block or convolutional code prior to being sequentially modulated in modulator 21d, amplified by power amplifier 22d and transmitted by antenna 13 in area coverage beam 12. In this manner an area coverage beam of lower capacity is provided, and redundancy is added using coding at the transmitter such that the transmitted area coverage beam 12 occupies the entire spectral band used by the spot coverage beams 14a–14c. Coding provides the advantages of (1) reducing the area coverage beam transmitter power required to achieve some given bit error rate which is highly desirable for satellite communication, and (2) reduces the mutual interference between the area and spot beam signals.

It is to be understood that data sources 20a–20d, modulators 21a–21d and power amplifiers 22a–22d can comprise any suitable means capable of providing the function described hereinabove. Similarly channel encoder 23 can comprise any suitable means for encoding the digital data signals supplied by data source 20d into a forward error correcting code. For example, where the code used is a convolutional code, an encoder of any desired constraint length and code rate may be used.

Figure 3:
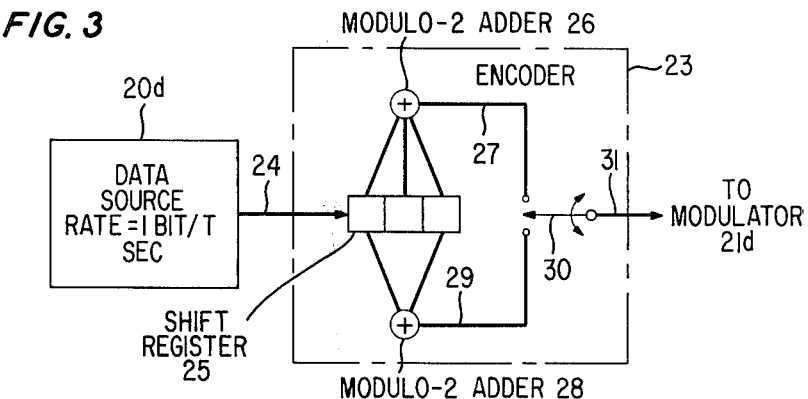
FIG. 3 depicts a typical prior art encoder for generating a constraint length=3, rate=½ binary convolutional code from an input stream of data.

A typical prior art arrangement for encoder 23 to produce a convolutionally encoded area coverage signal having a simple constraint length K=3, rate=½ binary convolutional code is illustrated in FIG. 3. It is to be understood that such description is exemplary only and is for purposes of exposition and not for purposes of limitation. It will be readily appreciated that other constraint lengths and rates or codes and their implementations are equally applicable to permit channel separation at the receivers. In FIG. 3, digital data signals for the area coverage beam are generated in data source 20d at the rate of one bit every T seconds for transmission over line 24 to encoder 23. At encoder 23 the received data signals are shifted into a three-bit shift register 25, or any other suitable means, at the rate of one bit every T seconds. A first modulo-2 adder 26 operates on the information stored in all three bits in register 25 to produce a resultant first binary bit on transmission line 27 while, simultaneously, a second modulo-2 adder 28 operates on the first and third bits in register 25 to produce a resultant second binary bit on transmission line 29. During each T second, a commutator 30 first selects the signal on first transmission line 27 and then the signal on second transmission line 29 and thereby transmits two binary digits over line 31 to modulator 21d for each data bit shifted into register 25. Therefore, for each data bit from data source 20d the encoder 23 generates two data bits at its output and the encoded data is then modulated and amplified prior to transmission via area coverage beam 12 to the ground stations disposed within ground area 18.

In the present arrangement, data sources $20a$–$20c$ generate two bits of data every T seconds for transmission via spot coverage beams $14a$–$14c$, respectively, while data source $20d$, generating one data bit every T seconds, in combination with encoder 23, which provides redundancy and generates two data bits for every data bit from source $20d$, also generates two bits of data every T seconds for transmission via area coverage beam 12. Therefore, the data rate of all antenna radiated beams is the same with area coverage beam 12 having a lower capacity than each of spot coverage beams $14a$–$14c$.

Separation of interfering uncoded spot beam and coded area beam signals is achieved in accordance with the present invention by providing a suitable detector at each of spot beam ground stations $17a$–$17c$ and area beam ground stations $19a$–$19d$. At each spot beam ground station $17a$–$17c$, the receiver performs a suitable detection of the spot beam signal received by that ground station plus the received area beam signal, as will be described hereinafter. After the signals are separated the information content of the interfering area beam is discarded. At each area beam ground station $19a$–$19d$ which experiences interference from a spot beam signal, a suitable detection of the desired area beam signal plus the unwanted interfering spot beam signal is again performed and the information content of the interfering spot beam signal is discarded after separation.

It is to be understood that a suitable detection process can comprise any process which will enable the separation of the two digital signals and the decoding of the forward error correcting coded signal. For example, where the two digital signals have different signal strengths at the receiver, separation may be achieved using a threshold detecting process. Alternatively, where the two received digital signals have approximately the same signal strength, a maximum-likelihood detection process may be performed. The type of detection process employed, however, will depend primarily on the amount of signal degradation which can be tolerated since each of the known detection processes would produce a certain amount of degradation in separating and decoding the two signals described hereinbefore.

Although the above detection methods can be used the preferred method of separating and decoding a simultaneously received uncoded first digital signal and a forward error correcting encoded second digital signal with minimal degradation is accomplished using the novel technique of joint maximum-likelihood detection as will be described hereinafter.

Convolutional decoders and maximum-likelihood detection systems are well known in the art. In this regard see, for example, U.S. Pat. Nos. 3,789,360 issued to G. C. Clark, Jr. et al on Jan. 29, 1974 and No. 3,815,028 issued to G. Rabow on June 4, 1974; and U.S. patent application Ser. No. 788,887 filed for A. Acampora on Apr. 19, 1977 now U.S. Pat. No. 4,087,787. In the convolutional decoding process described in the above-mentioned references, data is not decoded as soon as it is received from the channel. Instead, a sequence of data, having a predetermined decoding depth, following the digit to be decoded is first collected. Then, by computing what are known as path metrics, a limited number of possible messages are selected, each extending throughout the decoding depth far beyond the digit presently to be decoded, with one such survivor sequence ending in each of the data states.

A correlation between each survivor sequence and the data actually received is computed for the entire decoding depth under consideration. The highest correlated of the survivor sequences is then selected to be the sole survivor sequence. The earliest received digit or digits within the decoding depth is then permanently decoded under the temporary assumption that the sole survivor is the correct sequence.

More particularly, decoding is accomplished by forming the log-likelihood function which hereinafter will be referred to as the path metric. Two samples are taken every T seconds and the path metric is formed for each possible source sequence, and that sequence for which the metric is largest is selected as the best estimate to the true transmitted sequence.

As was shown in the prior art references cited hereinbefore, metric calculations are an application of dynamic programming techniques and that maximum-likelihood decoding can be performed without actually finding the path metric for each sequence. The procedure for decoding the convolutionally encoded area beam signal is illustrated by the State diagram of FIG. 4. The State is defined as the contents of the first two stages of shift register 25, which changes at a T-second rate. When considering State 00, at time $t_o + T$, this State can be reached from either of States 00 or 01, both transitions corresponding to a data bit 0 having entered the coder. If the partial metrics corresponding to each of the two merging paths are known up to and including time $t_o = T$, then since the two paths have merged, the most likely path leaving State 00 for $t > t_o + T$ must contain, as a subset, the path with the greatest metric up to that point since future samples cannot affect past metrics.

At each of the spot beam ground stations $17a$–$17c$ and each of area beam ground stations $19a$–$19d$ having interference from a spot beam signal, the input signal to the maximum-likelihood detector comprises two coded area beam channel symbols and two uncoded spot beam channel symbols every T seconds which interfere with each other. Therefore, in the State diagram of FIG. 4, four most-likely paths actually exist for each of the single paths shown for the transitions between States. More particularly, as shown for the transition from State 00 to State 00, the first two symbols for each of the four paths denote the source coding for this particular transition, which is common to each of the possible paths, while the last two symbols denote the four possible data symbols which may exist for the first and second spot beam symbols received during each T seconds. It is to be understood that each of the other transitions between States similarly comprises four possible paths with corresponding symbols to denote the possible received symbols.

FIG. 5 is a block diagram of a typical arrangement for a novel joint maximum-likelihood detector capable of decoding a constraint length=3, rate=$\frac{1}{2}$ binary convolutional coded area beam 12 and uncoded spot beam 14 and providing a binary output every T seconds indicating both the two most likely information digits received via the interfering spot beam 14 and generated by the associated data source 20, and the decoded most likely information digit received in coded form via interfering area beam 12 and generated by data source $20d$. It is to be understood that the arrangement of FIG. 5 is exemplary only and is for purposes of exposition and not for purposes of limitation. It will be readily appreciated that the inventive concepts described are equally applicable to decode an interfering uncoded first beam and convolutionally coded second beam having different constraint lengths and rates or nonbinary or multi-level alphabets, transmissions, etc., after the appropriate modification is made as will be easily determined by one skilled in the art once the constraint length and rate is known.

As shown in FIG. 5, the present joint maximum-likelihood detector is segmented into four States, each State corresponding to a different one of the possible combinations of one's and zero's in the first two stages of register 25 in encoder 23. A separate sample of the received waveform at each ground station is taken every T/2 seconds, and every T seconds the two samples which may be in digital or analog form, are made available at input 40 of the present detector, each sample comprising elements of the interfering area beam and spot beam signals. During each clock cycle T, the detector recursively computes in processors 41a–41d the path metric of the most likely path, of the eight paths, leading to each State. This computation is in the form:

$$\Lambda_n = \Lambda_{n-1} + 2r_{2n-2}[\sqrt{E_1}\xi_{2n-2} + \sqrt{E_2}y_{2n-2}] + 2r_{2n-1}[\sqrt{E_1}\xi_{2n-1} + \sqrt{E_2}y_{2n-1}] - 2\sqrt{E_1 E_2}[\xi_{2n-2}y_{2n-2} + \xi_{2n-1}y_{2n-1}] \quad (1)$$

where
- $\Lambda_n$ = the new path metric
- $\Lambda_{n-1}$ = the most likely path metric leading into the state from which a transition is made
- $r_{2n-2}, r_{2n-1}$ = the two samples of the received process received during $n^{th}$ clock cycle
- $E_1$ = the signal energy/channel bit of the spot beam signal
- $E_2$ = the signal energy/channel bit of the area beam signal
- $\xi_{2n-2}, \xi_{2n-1}$ = the assumed spot beam channel digits corresponding to a transition
- $y_{2n-2}, y_{2n-1}$ = the assumed area beam channel digits corresponding to a transition.

As was stated hereinbefore, there are a total of eight paths leading to each of the four States. For each State the detector computes the eight path metrics, finds the largest one of the eight path metrics, saves the largest path metric, and stores the path corresponding to the largest metric. This process will now be described in greater detail for processing the path metrics for State 00, and it is understood that a corresponding process is concurrently performed for processing the path metrics for the other States 01, 10 and 11.

In FIG. 5, the largest path metric for States 00, 01, 10 and 11 computed in the previous T second cycle is stored in storage devices 42a–42d, respectively, and have the respective designations $M_1$–$M_4$. The outputs from storage devices 42a–42d are normalized in normalization means 43 by, for example, arbitrarily setting one of the four old metrics, $M_1$–$M_4$, equal to zero after first having effectively subtracted its value from the remaining three metrics. These normalized old path metrics are designated $M_{n1}$–$M_{n4}$. This step prevents the successive path metrics from growing linearly with time.

Figure 4:
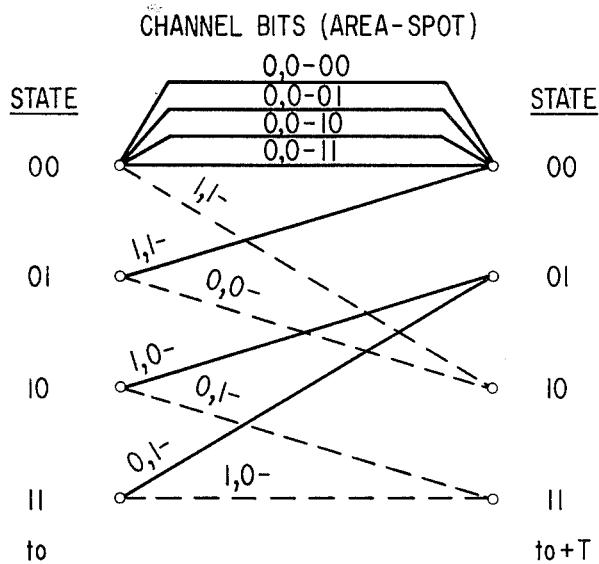
FIG. 4 is a decoding diagram illustrating the allowable State transitions and channel symbols for both the convolutionally encoded area coverage beam signal and one interfering uncoded spot coverage beam signal of FIG. 2.

From FIG. 4, it can be seen that the transition into State 00, at time $t_o + T$, can only be effected from prior States 00 and 01. Therefore, in processor 41a of FIG. 5, the old path metrics $M_{n1}$ associated with State 00 is used together with the appropriate value of the two samples available at input 40 in correlator 44a to compute the path metrics for each of the four possible paths between State 00 at time $t_o$ and State 00 at time $t_o + T$ in FIG. 4. These four path metrics are indicated by the symbols $M_{11}'$–$M_{14}'$ at the output of correlator 44a. Similarly the old path metric $M_{n2}$ associated with State 01 is used together with the appropriate value of the two samples available at input 40 in correlator 44b to compute the path metrics for each of the four possible paths between State 01 at time $t_o$ and State 00 at time $t_o + T$. These four path metrics are indicated by the symbols $M_{11}''$–$M_{14}''$ at the output of correlator 44b. The eight path metrics computed in correlators 44a and 44b are compared in comparator 45 and the largest one of the eight path metrics is determined. The comparator 45 is strobed by a system clock 46 via a signal on lead 47 to provide the result of comparison at the appropriate sampling instance once every T seconds.

The value of the largest path metric for State 00 is transmitted from comparator 45 to storage means 42a via lead 48 where it is stored for use during the next processing cycle T. The one of eight paths leading into a State having the largest value also indicates the most likely digital value for both the decoded area beam signal and the two sequential uncoded spot beam signals generated during a prescribed T second period by the associated data sources 20 at the satellite 10. For example, if comparator 45 determined that the largest path metric corresponded to the uppermost path between State 00 and State 00 in FIG. 4, then the most likely value for the bit generated by data source 20d at satellite 10 during the corresponding T second interval would be a zero while the most likely value for the first and second sequential bits received via the interfering spot beam 14 during that same T second interval would be a 0, 0, respectively.

In FIG. 5, the decoded binary value of the most likely bit received via interfering area beam 12 for State 00 is shown as being stored in a shift register 50a or other suitable means, while the binary values for the most likely first and second sequential bits for State 00 received via interfering spot beam 14 are stored in shift registers 51a and 52a, respectively, or any other suitable means. The outputs from comparators 45 in processors 41b–41d similarly load registers 50b–50d, 51b–51d and 52b–52d for the most likely binary value for each decoded area beam bit and the first and second sequentially received spot beam bits, respectively, or the respective States 01, 10 and 11. Each of shift registers 50a–50d, 51a–51d and 52a–52d have a path memory length which preferably is about 4–5 equivalent constraint lengths, implying that, with high probability, all surviving paths have a common prefix. Thus, the final state of any one of registers 50a–50d may be selected as the decoded most likely information digits for the received interfering area beam signal. Similarly the final stage of any one of registers 51a–51d and 52a–52d may be selected as the most likely information digits for the first and second sequential digits, respectively, received via the interfering spot beam signal. Alternatively, the last stage of each group of registers 50a–50d, 51a–51d and registers 52a–52d can be used as a separate input to a separate well-known majority logic gate associated with a particular group of registers which functions to choose the output value indicated by the majority of the final stages of the associated group, and in the event of a tie to output a 0 or a 1. A second alternative would be to select the final stage of the register within each group of registers indicating maximum likelihood.

Where the ground station performing the described joint maximum-likelihood detection process is, for example, a spot beam ground receiving station, only the most likely spot beam digits in registers 51a–51d and 52a–52d will be of interest for further processing and, therefore, registers 50a–50d for storing the decoded most likely area beam digits can be eliminated. Similarly at each area beam ground receiving station only registers 50a–50d need be supplied. However, as was stated previously, when the present invention is applied to increasing the capacity of a radio channel by transmitting a first uncoded signal and a second coded signal of lower capacity on the same channel with each signal using the same frequency spectrum, such combined signals will usually be destined for the same receiver and, therefore, registers 50a–50d will be required for generating the decoded most likely second signal digits along with registers 51a–51d and 52a–52d for generating the most likely first signal digits at the receiver.

It is to be understood that the above-described embodiments are simply illustrative of the principles of the invention. Various other modifications and changes may be made by those skilled in the art which will embody the principles of the invention and fall within the spirit and scope thereof. For example, correlators 44a and 44b can comprise circuitry for processing either analog input signals in the manner shown, for example, in U.S. patent application Ser. No. 788,887 filed for A. Acampora on Apr. 19, 1977, now U.S. Pat. No. 4,087,787 or digital signals using logic gate sequences to compute the necessary path metrics. Similarly, comparators 45 and storage means 42a–42d can comprise means for comparing and storing, respectively, analog or digital values in order to be compatable with the arrangements of correlators 44a and 44b.

What is claimed is:

1. A method of separating and substantially reducing interference at a receiver between a first and a second digital information signal which use the same frequency spectrum and are received by the receiver from approximately the same direction, the method comprising the steps of:

at a remote transmitter
   (a) transmitting the first digital information signal in uncoded form in a predetermined frequency band in a first direction; while concurrently.
   (b) transmitting the second digital information signal having a different informational content in coded form and at a lower information transmission capacity than said first information signal in said predetermined frequency band in said first direction, said code used comprising a forward error correcting code; and at the receiver receiving said uncoded first digital information signal and said coded second digital information signal
   (c) performing a detection process on the uncoded first digital information signal and the coded second digital information signal for generating the most likely digits representative of the received first digital information signals and decoded second digital information signal.

2. The method according to claim 1 wherein said first digital information signal is transmitted in a first antenna radiated beam covering a first receiving area and said second digital information signal is transmitted in a second antenna radiated beam covering a second receiving area which is at least partially overlapped by said first receiving area.

3. The method according to claim 1 wherein said first digital information signal and said second digital information signal are transmitted in the same antenna radiated radio channel to the receiver.

4. The method according to claim 1 wherein said forward error correcting code is a convolutional code and in performing step (c)
   (1) computing likelihood functions for all possible transitions into each state of the convolutional code by using a first and a second sample of the received signal, which includes elements of the interfering first and second digital information signals, and the most recently computed most probable likelihood function for each possible state of the convolutional code to generate signals representative of the computed likelihood function,
   (2) comparing the signals representative of the computed likelihood functions associated with each of said states as generated in step (1) for determining the most probable transition into each state of the convolutional code and generating a signal indicative of said most probable transition into each state; and
   (3) in response to the signal generated in step (2), concurrently storing (a) the value of said signal for subsequent use in reiteration of step (c) (1), and (b) the most likely data sequence into each state over a predetermined length for any desired combination of the interfering first received digital information signal and the decoded second received digital information signal for producing an output stream of digital data corresponding to the most likely estimate of the desired digital signal.

5. A communication system capable of substantially cancelling the effects of interference at a receiver between a first and a second received digital information signal which use the same predetermined frequency spectrum, comprising
   a transmitter comprising
      a first transmission section including means for modulating a first input digital information signal to the predetermined frequency spectrum;
      a second transmission section including means capable of both encoding a second input digital information signal, having a different informational content and a lower information transmission capacity than said first digital information signal, using a forward error correcting code and modulating the second encoded digital information signal to said predetermined frequency spectrum; and
      means for concurrently transmitting each of the modulated first digital information signal and the encoded and modulated second digital information signal in a predetermined direction; and
   a receiver disposed in the path of said transmitted first and second digital information signals comprising a detector which includes decoding means capable of generating from the combined received signal of the interfering uncoded first digital information signal and coded second digital information signal the most likely digits representative of the desired first digital information signal and decoded second digital information signal.

6. A communication system according to claim 5 wherein said forward error correcting code is a convolutional code having a predetermined plurality of possible states and an arbitrary code rate; said detector at the receiver is a joint maximum-likelihood detector comprising first means capable of computing likelihood functions for all possible transitions into each of the plurality of possible states of the convolutional code in combination with all possible values of the interfering uncoded first digital information signal, said first means using both selective values of sequential first and second samples of the received waveform, which comprise elements of both the uncoded first and coded second digital information signals, and signals representative of the most recently computed most probable likelihood function for each of said plurality of possible states of the convolutional code and the associated most likely possible value for the received first digital information signal for computing the likelihood functions;

second means connected to the output of said first means for comparing the signals representative of the likelihood functions associated with each state of the convolutional code and the associated possible values for the uncoded interfering first digital information signal and generating an output signal indicating the most probable transition into each state of said plurality of possible states and the most probable value for the first digital information signal;

third means connected between said second and first means capable of temporarily storing the most recently computed voltage signal generated by said first means representative of the most probable likelihood function for each state and associated most probable value of the first digital information signal for subsequent use by said first means for computing the likelihood functions for each possible transition during the next time interval; and fourth means responsive to the output of said second means for storing any combination of the most likely data sequence into each state of the convolutional code and the most likely data sequence for each state for the first digital information signal over a predetermined length and for producing at an output terminal thereof a stream of data corresponding to the data for the desired uncoded first digital information signal and decoded second digital information signal.

7. A communication system according to claim 5 wherein said transmitter is a satellite and said concurrently transmitting means transmits said digitally modulated first information signal via a spot coverage beam and said encoded and digitally modulated second information signal via an area coverage which at least partially overlaps the receiving area of said spot coverage beam.

8. A communication system according to claim 5 wherein said concurrently transmitting means transmits the digitally modulated first information signal and encoded and digitally modulated second information signal as a single radio channel.

9. A transmitter comprising
a first transmission section including means for modulating a first input digital information signal to a predetermined frequency spectrum;
a second transmission section including means capable of both encoding a second input digital information signal having a different informational content and a lower information transmission capacity than said first digital information signal using a forward error correcting code and modulating the second digital information signal to said predetermined frequency spectrum; and
means for concurrently transmitting each of the digitally modulated first information signal and the encoded and digitally modulated second information signal in a predetermined direction.

10. A transmitter according to claim 9 where said transmitter is a satellite and said concurrently transmitting means transmits said digitally modulated first information signal via a spot coverage beam and said encoded and digitally modulated second information signal via an area coverage beam which at least partially overlaps the spot beam receiving area.

11. A transmitter according to claim 9 wherein said concurrently transmitting means transmits the digitally modulated first information signal and encoded and digitally modulated second information signal as a single radio channel.

12. In a communication system comprising a transmitter which concurrently transmits a first digital information signal in uncoded form in a predetermined frequency spectrum and a second digital information signal having a different informational content and lower information transmission capacity than the first digital information signal in coded form using a forward error correcting code in the predetermined frequency spectrum towards a predetermined receiving area, a receiver comprising means for receiving the interfering uncoded first digital information signal and coded digital second information signal; and a detector which includes decoding means capable of generating from the combined received signal of said interfering uncoded first information signal and coded second information signal the most likely digits representative of the desired uncoded first digital information signal and decoded second digital information signal.

13. A receiver according to claim 12 wherein said forward error correcting code is a convolutional code and said detector is a joint maximum-likelihood detector comprising first means capable of computing likelihood functions for all possible transitions into each of the plurality of possible states of the convolutional code in combination with all possible values of the interfering uncoded first digital information signal, said first means using both (a) selective values of sequential first and second samples of the received waveform which comprise elements of both the uncoded first and coded second digital information signals and (b) signals representative of the most recently computed most probable likelihood function for each of said plurality of possible states of the convolutional code and the associated most likely possible value for the received first digital information signal for computing the likelihood functions and generating signals representative thereof;

second means connected to the output of said first means for comparing the signals representative of the likelihood functions associated with each state and the associated possible values for the interfering first digital information signal and generating an output signal representative of both the most probable transition into each state of said plurality of possible states and the most probable value for the first digital information signal;

third means connected between said second and first means capable of temporarily storing the most recently computed signal generated by said first means representative of the most probable likelihood function for each state and associated most probable value of the first digital information signal for subsequent use by said first means for computing the likelihood functions for each possible transition during the next time interval; and fourth means responsive to the output of said second means for storing any combination of the most likely data sequence into each state of the convolutional code and the most likely data sequence for each state for the first digital information signal over a predetermined length and for producing at an output terminal thereof a stream of data corresponding to the data for the desired first digital information signal and decoded second digital information signal.

* * * * *